(12) United States Patent
Liu et al.

(10) Patent No.: US 10,505,393 B2
(45) Date of Patent: Dec. 10, 2019

(54) AUTOMATED CHARGING

(71) Applicant: Microsoft Technology Licensing, LLC, Redmond, WA (US)

(72) Inventors: Yunxin Liu, Beijing (CN); Chunshui Zhao, Beijing (CN); Yongguang Zhang, Beijing (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 4 days.

(21) Appl. No.: 15/392,536

(22) Filed: Dec. 28, 2016

(65) Prior Publication Data
US 2017/0110904 A1    Apr. 20, 2017

Related U.S. Application Data

(62) Division of application No. 13/960,580, filed on Aug. 6, 2013, now Pat. No. 9,559,545.

(51) Int. Cl.
*H02J 50/10* (2016.01)
*H02J 50/80* (2016.01)
(Continued)

(52) U.S. Cl.
CPC .............. *H02J 50/10* (2016.02); *B60L 53/12* (2019.02); *B60L 53/60* (2019.02); *B60L 53/65* (2019.02);
(Continued)

(58) Field of Classification Search
CPC ........ H02J 7/025; H02J 7/0027; H02J 7/0004; H02J 5/005; H02J 7/0047; H02J 17/00;
(Continued)

(56) References Cited

U.S. PATENT DOCUMENTS

| 6,707,274 B1 | 3/2004 | Karr |
| 6,792,259 B1 | 9/2004 | Parise |

(Continued)

FOREIGN PATENT DOCUMENTS

| EP | 2097996 A2 | 9/2009 |
| WO | WO2001001544 A1 | 1/2001 |
| WO | WO2010096709 A2 | 8/2010 |

OTHER PUBLICATIONS

Abbasi, "Wireless Power Transfer Using Microwaves at 2.45 GHz ISM Band," In Proceedings of 6th International Bhurban Conference on Applied Sciences and Technology, published Jan. 19, 2009, retrieved at <<http://ieeexplore.ieee.org/stamp/stamp.jsp?tp=&arnumber=5596172>> 4 pages.

(Continued)

*Primary Examiner* — Helen Rossoshek
(74) *Attorney, Agent, or Firm* — Schwegman Lundberg & Woessner, P.A.

(57) ABSTRACT

Techniques for facilitating wireless charging are discussed herein. For example, a power-consuming device may receive a light beam from a charging device. In response, the power-consuming device may determine a power level of a battery associated with the power-consuming device. The power-consuming device may wirelessly signal the power level to the charging device. In some instances, the power-consuming device may determine the power level of the battery without drawing power from the battery. Further, in some instances the power-consuming device may receive another light beam to charge the battery.

12 Claims, 5 Drawing Sheets

(51) Int. Cl.
| | |
|---|---|
| *H02J 50/30* | (2016.01) |
| *H02J 7/00* | (2006.01) |
| *G06F 1/3215* | (2019.01) |
| *H02J 50/90* | (2016.01) |
| *H02J 50/12* | (2016.01) |
| *H02J 7/02* | (2016.01) |
| *B60L 53/12* | (2019.01) |
| *B60L 53/60* | (2019.01) |
| *B60L 53/65* | (2019.01) |
| *B60L 58/12* | (2019.01) |

(52) U.S. Cl.
CPC .......... *B60L 58/12* (2019.02); *G06F 1/3215* (2013.01); *H02J 7/0021* (2013.01); *H02J 7/0027* (2013.01); *H02J 7/025* (2013.01); *H02J 7/027* (2013.01); *H02J 50/12* (2016.02); *H02J 50/30* (2016.02); *H02J 50/80* (2016.02); *H02J 50/90* (2016.02); *B60L 2240/70* (2013.01); *Y02T 10/7005* (2013.01); *Y02T 10/705* (2013.01); *Y02T 10/7044* (2013.01); *Y02T 10/7072* (2013.01); *Y02T 10/7094* (2013.01); *Y02T 10/7291* (2013.01); *Y02T 90/121* (2013.01); *Y02T 90/122* (2013.01); *Y02T 90/128* (2013.01); *Y02T 90/14* (2013.01); *Y02T 90/16* (2013.01); *Y02T 90/163* (2013.01); *Y02T 90/169* (2013.01); *Y04S 30/14* (2013.01)

(58) Field of Classification Search
CPC ...... H02J 2007/0098; H02J 7/045; H02J 7/35; H02J 7/0013; H02J 50/10; H04M 1/72519; H04M 10/4257; G08B 13/1427; G08B 21/0277; Y02T 90/128; Y02T 10/7005; Y02T 90/121
See application file for complete search history.

(56) References Cited

U.S. PATENT DOCUMENTS

| | | | |
|---|---|---|---|
| 7,531,984 B2 | 5/2009 | Freed et al. | |
| 7,772,802 B2 | 8/2010 | Manico et al. | |
| 7,793,121 B2 | 9/2010 | Lawther et al. | |
| 8,169,185 B2 | 5/2012 | Partovi et al. | |
| 8,358,101 B2 | 1/2013 | Dowdy et al. | |
| 8,378,631 B2 | 2/2013 | Ron et al. | |
| 8,736,228 B1 | 5/2014 | Freed et al. | |
| 9,026,080 B2 | 5/2015 | Moran et al. | |
| 9,065,489 B2 | 6/2015 | Mach et al. | |
| 9,711,980 B2* | 7/2017 | Hodges .................. G06F 1/1632 | |
| 2002/0089305 A1* | 7/2002 | Park ........................ H02J 50/10 | 320/108 |
| 2002/0137568 A1* | 9/2002 | Kaneko .................... A63F 9/143 | 463/58 |
| 2005/0127867 A1 | 6/2005 | Calhoon et al. | |
| 2006/0273749 A1* | 12/2006 | Im ........................ G05D 1/0225 | 318/587 |
| 2007/0030455 A1 | 2/2007 | Inoue | |
| 2008/0007212 A1* | 1/2008 | Theytaz ................. H02J 7/0013 | 320/107 |
| 2008/0180060 A1 | 7/2008 | Odell et al. | |
| 2008/0211458 A1* | 9/2008 | Lawther .................. H02J 7/025 | 320/132 |
| 2008/0258679 A1* | 10/2008 | Manico .................... H02J 50/10 | 320/106 |
| 2008/0315826 A1 | 12/2008 | Alberth, Jr. et al. | |
| 2009/0096413 A1 | 4/2009 | Partovi et al. | |
| 2009/0284225 A1 | 11/2009 | Nakanuma et al. | |
| 2010/0039066 A1 | 2/2010 | Yuan et al. | |
| 2010/0081378 A1 | 4/2010 | Kawamura | |
| 2010/0093401 A1 | 4/2010 | Moran et al. | |
| 2010/0174629 A1 | 7/2010 | Taylor et al. | |
| 2010/0201314 A1 | 8/2010 | Toncich et al. | |
| 2011/0050164 A1 | 3/2011 | Partovi et al. | |
| 2011/0080135 A1 | 4/2011 | Bland | |
| 2011/0115430 A1* | 5/2011 | Saunamaki ............. H02J 5/005 | 320/108 |
| 2011/0133687 A1* | 6/2011 | Kim ........................ H04M 1/21 | 320/101 |
| 2011/0156640 A1 | 6/2011 | Moshfeghi | |
| 2012/0007445 A1 | 1/2012 | Hyde et al. | |
| 2012/0139690 A1 | 6/2012 | Gupta et al. | |
| 2012/0146576 A1 | 6/2012 | Partovi | |
| 2012/0221473 A1 | 8/2012 | Redmann et al. | |
| 2012/0235499 A1 | 9/2012 | Liu et al. | |
| 2012/0237053 A1 | 9/2012 | Alam et al. | |
| 2012/0268238 A1 | 10/2012 | Park et al. | |
| 2013/0027183 A1 | 1/2013 | Wu et al. | |
| 2013/0314028 A1* | 11/2013 | Tseng .................... H02J 7/0042 | 320/107 |
| 2014/0239732 A1 | 8/2014 | Mach et al. | |
| 2014/0265998 A1* | 9/2014 | Nielson ................. H02J 7/0047 | 320/101 |
| 2014/0292269 A1 | 10/2014 | Keating et al. | |
| 2014/0306657 A1 | 10/2014 | Lundgren et al. | |
| 2014/0315604 A1 | 10/2014 | Miyake | |
| 2014/0337621 A1 | 11/2014 | Nakhimov | |
| 2015/0042287 A1 | 2/2015 | Liu et al. | |
| 2015/0137747 A1* | 5/2015 | Salter ........................ A61L 2/10 | 320/108 |
| 2015/0280488 A1* | 10/2015 | Wyrwas .................... H02J 7/35 | 320/101 |
| 2015/0380954 A1* | 12/2015 | Poulton .................. H02J 7/007 | 320/106 |
| 2016/0052407 A1 | 2/2016 | Shimizu | |
| 2016/0099756 A1 | 4/2016 | Leabman et al. | |
| 2016/0218553 A1 | 7/2016 | He et al. | |

OTHER PUBLICATIONS

Becquerel, "Memoire surples effects electriques produits sous l'influence des rayons solaires," Computes Rendus, pp. 561-567, 1839.
Bright Running Shoes, retrieved on May 28, 2013 at <<http://www.amazon.com>> 6 pages.
Brown, "The History of Power Transmission by Radio Waves," In Proceedings of IEEE Transactions on Microwave Theory and Techniques, vol. 32, Issue 9, published Sep. 1984, retrieved at >>http://ieeexplore.ieee.org/xpl/login.jsp?tp=&arnumber=1132833&url=http%3A%2F%2Fieeexplore.ieee.org%2Fxpls%2Fabs_all.jsp%3Farnumber%3D1132833>> 13 pages.
Christ et al., "Evaluation of Wireless Resonant Power Transfer Systems with Human Electromagnetic Exposure Limits, Electromagnetic Compatibility," In Proceedings of IEEE Transactions on Electromagnetic Compatibility, vol. 55, Issue 2, published Apr. 2013, retrieved at <<http://ieeexplore.ieee.org/stamp/stamp.jsp?tp=&arnumber=6340322&isnumber=4358749>> 10 pages.
DFRobot Drive the Future, retrieved at May 28, 2013 at <<http://www.dfrobot.com/index.php>> 2 pages.
Dong et al., "Chameleon: a Color-Adaptive Web Browser for Mobile OLED Displays," In Proceedings of the 9th International Conference on Mobile Systems, Applications, and Services, published Jun. 28, 2011, retrieved at <<http://www.ruf.rice.edu/~mobile/publications/dong11mobisys_chameleon.pdf>> 14 pages.
Duda et al., "Use of the Hough Transformation to Detect Lines and Curves in Pictures," In Magazine of Communications of the ACM, vol. 15, Issue 1, published Jan. 1972, retrieved at <<http://www.cse.unr.edu/~bebis/CS474/Handouts/HoughTransformPaper.pdf>> 5 pages.
Google Play, retrieved on May 28, 2013 at <<https://play.google.com/store??>> 1 page.
Han et al., "DozyAP: Power-Efficient Wi-Fi Tethering," In Proceedings of the 10th International Conference on Mobile Systems, Applications, and Services, published Jun. 24, 2012, retrieved at <<http://research.microsoft.com/pubs/165617/DozyAP-MobiSys2012.pdf>> 14 pages.
Huawei Device, retrieved on May 28, 2013 at <<http://www.huaweidevice.com>> 1 page.

(56) References Cited

OTHER PUBLICATIONS

Kang et al., "SeeMon: Scalable and Energy-efficient Context Monitoring Framework for Sensor-rich Mobile Environments," In Proceedings of the 6th International Conference on Mobile Systems, Applications, and Services, published Jun. 17, 2008, retrieved at <<http://nclab.kaist.ac.kr/papers/Conference/mobisys08-SeeMon.pdf>> 14 pages.
Kindle Fire HD: The Ultimate HD Experience, retrieved at May 28, 2013 at <<http://www.amazon.com>> 3 pages.
Kinect for Xbox 360, retrieved on May 28, 2013 at <<http://www.xbox.com/en-US/kinect>> 2 pages.
Kurs, "Wireless Power Transfer via Strongly Coupled Magnetic Resonances," In Proceedings Science of AAAS, vol. 317, published Jul. 6, 2007, retrieved at >>http://www2.Ins.mit.edu/fisherp/83.pdf>> 5 pages.
Leavitt, "Photovoltaic Polarizers Could Make Self-Charging Smartphone Dreams Come True," published Aug. 11, 2011, retrieved on <<http://www.engadget.com/2011/08/11/photovoltaic-polarizers-could-make-self-charging-smartphone-drea/>> 3 pages.
Li, "Wireless Power Transmission: State-of-the-Arts in Technologies and Potential Applications," In Proceedings of Asia-Pacific Microwave Conference (APMC), published Dec. 5, 2011, retrieved at <<http://ieeexplore.ieee.org/stamp/stamp.jsp?tp=&arnumber=6173692>> 4 pages.
Lu et al., "The Jigsaw Continuous Sensing Engine for Mobile Phone Applications," In Proceedings of the 8th ACM Conference on Embedded Networked Sensor Systems, published Nov. 3, 2010, retrieved at <<http://www.cs.dartmouth.edu/~campbell/papers/jigsaw.pdf>> 14 pages.
Mittal et al., "Empowering Developers to Estimate App Energy Consumption," In Proceedings of the 18th Annual International Conference on Mobile Computing and Networking, published Aug. 22, 2012, retrieved at <<http://research.microsoft.com/pubs/166288/WattsonMobicom12.pdf>> 11 pages.
Nath, "ACE: Exploiting Correlation for Energy-Efficient and Continuous Context Sensing," In Proceedings of the 10th International Conference on Mobile Systems, Applications, and Services, Published Jun. 25, 2012, retrieved at <<http://research.microsoft.com/pubs/160599/main.pdf>> 14 pages.
Noda et al., "Selective Wireless Power Transmission through High-Q Flat Waveguide-Ring Resonator on 2-D Waveguide Sheet," In IEEE Transactions on Microwave Theory and Techniques, vol. 59, Issue 8, published Aug. 2011, retrieved at <<http://ieeexplore.ieee.org/stamp/stamp.jsp?tp=&arnumber=5875914>> 10 pages.
Nokia Wireless Charging Plate, retrieved on May 28, 2013 at <<http://www.nokia.com/us-en/accessories/accessory/dt-900/>> 7 pages.
Office action for U.S. Appl. No. 13/960,580, dated Mar. 28, 2016, Liu et al., "Automated Charging", 16 pages.
Office action for U.S. Appl. No. 13/960,580, dated Dec. 16, 2015, Liu et al., "Automated Charging", 14 pages.
Office action for U.S. Appl. No. 13/960,580, dated Jul. 18, 2016, Liu et al., "Automated Charging", 15 pages.
Office action for U.S. Appl. No. 13/960,580, dated Aug. 10, 2015, Liu et al., "Automated Charging", 8 pages.
OpenCV, retrieved on May 28, 2013 at <<http://opencv.org >> 3 pages.
OpenNI, retrieved on May 28, 2013 at <<http://www.openni.org/>> 2 pages.
"International Search Report and Written Opinion Issued in PCT Patent Application No. PCT/US2014/047447", dated Dec. 12, 2014, 12 pages.
Ra et al., "Improving Energy Efficiency of Personal Sensing Applications with Heterogeneous Multi-Processors," In Proceedings of the ACM Conference on Ubiquitous Computing, published Sep. 5, 2012, retrieved at <<http://research.microsoft.com/pubs/164428/MultiProc-ubicomp12.pdf>> 10 pages.
Sample et al., "Analysis, Experimental Results, and Range Adaptation of Magnetically Coupled Resonators for Wireless Power Transfer," In IEEE Transactions on Industrial Electronics, vol. 58, Issue 2, Published Feb. 2011, retrieved at <<http://ieeexplore.ieee.org/xpls/abs_all.jsp?arnumber=5437250>> 11 pages.
Sklansky, "Finding the Convex Hull of a Simple Poly-gon, Pattern Recognition Letters," vol. 1, No. 2, pp. 79-83, 1982.
Suzuki et al., "Topological Structural Analysis of Digitized Binary Images by Border Following," In Proceedings of Computer Vision, Graphics, and Image Processing, vol. 30, Issue 1, published Apr. 1985, retrieved at <<http://tpf-robotica.googlecode.com/svn/trunk/Vision/papers/SA-CVGIP.PDF>> 15 pages.
Texas Instruments, retrieved on May 28, 2013, retrieved at <<http://en.wikipedia.org/wiki/Texas_Instruments>> 10 pages.
Two-Dimensional Signal/Power Transmission Technology for In-Room Networking and Circuit Integration in Fabrics, retrieved on May 28, 2013 at <<http://www.alab.t.u-tokyo.ac.jp/~shino/2Dcom/2DST.html>> 2 pages.
Williams, "Becquerel Photovoltaic Effect in Binary Compounds," The Journal of Chemical Physics 32 (5): pp. 1505-1514, 1960.
Wysips Technology Turns Smartphone Displays into Battery Chargers, published Feb. 27, 2013, retrieved at <<http://www.whathifi.com/news/wysips-technology-turns-smartphone-displays-into-battery-chargers>> 7 pages.
Wysips, an Energy Revolution, retrieved on May 24, 2013 at <<http://sunpartnergroup.com/mobile-phone/performances/>> 1 page.
XiaoMi Smartphone, retrieved on May 28, 2013 at <<XiaoMi Smartphone>> 2 pages.
Zhong. "Energy-Efficient Mobile System Design: the User's Perspective," In Doctoral Dissertation Energy-efficient Mobile System Design: the User's Perspective, published Sep. 2005, retrieved at <<http://www.ruf.rice.edu/~mobile/publications/dissertation.pdf>> 184 pages (in 5 parts).

* cited by examiner

AUTOMATED CHARGING

RELATED APPLICATION

This application is a divisional of and claims priority to U.S. patent application Ser. No. 13/960,580, filed on Aug. 6, 2013, the disclosure of which is incorporated by reference herein.

BACKGROUND

Nowadays, people normally have a number of power-consuming devices, such as mobile phones, tablets, portable music devices, etc. These devices are usually battery-powered and need to be recharged after a certain period of use, e.g., every day or even multiple times each day. This undoubtedly imposes a burden on users of these types of devices because they must regularly check whether their devices need to be recharged. Furthermore, given that the devices may use different type of chargers, people may need to carry chargers and/or buy additional chargers in order to recharge their devices at different locations. If a person fails to recognize that power level of a device is low or that the devices has run out of power, he or she may not be able to use that device when it is needed.

SUMMARY

This summary introduces simplified concepts of automated charging, which are further described below in the Detailed Description. This summary is not intended to identify essential features of the claimed subject matter, nor is it intended for use in limiting the scope of the claimed subject matter.

This application describes example embodiments of automated charging. In one embodiment, a charging device may detect a presence of a power-consuming device. The charging device may then determine a status of a power level of the power-consuming device without physical contact with the power-consuming device. The charging device may determine whether to charge the power-consuming device based on the status of the power level of the power-consuming device. If the power-consuming device is in need of charging, the charging device may charge the power-consuming device by, for example, directing a light beam to a power generation unit (e.g., a photovoltaic cell) of the power-consuming device. In some embodiments, the charging device may be configured to charge power-consuming devices of a plurality of types, including, for example, mobile phones of different models, tablets of different models, laptops of different models, etc.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Overview

Figure 1:
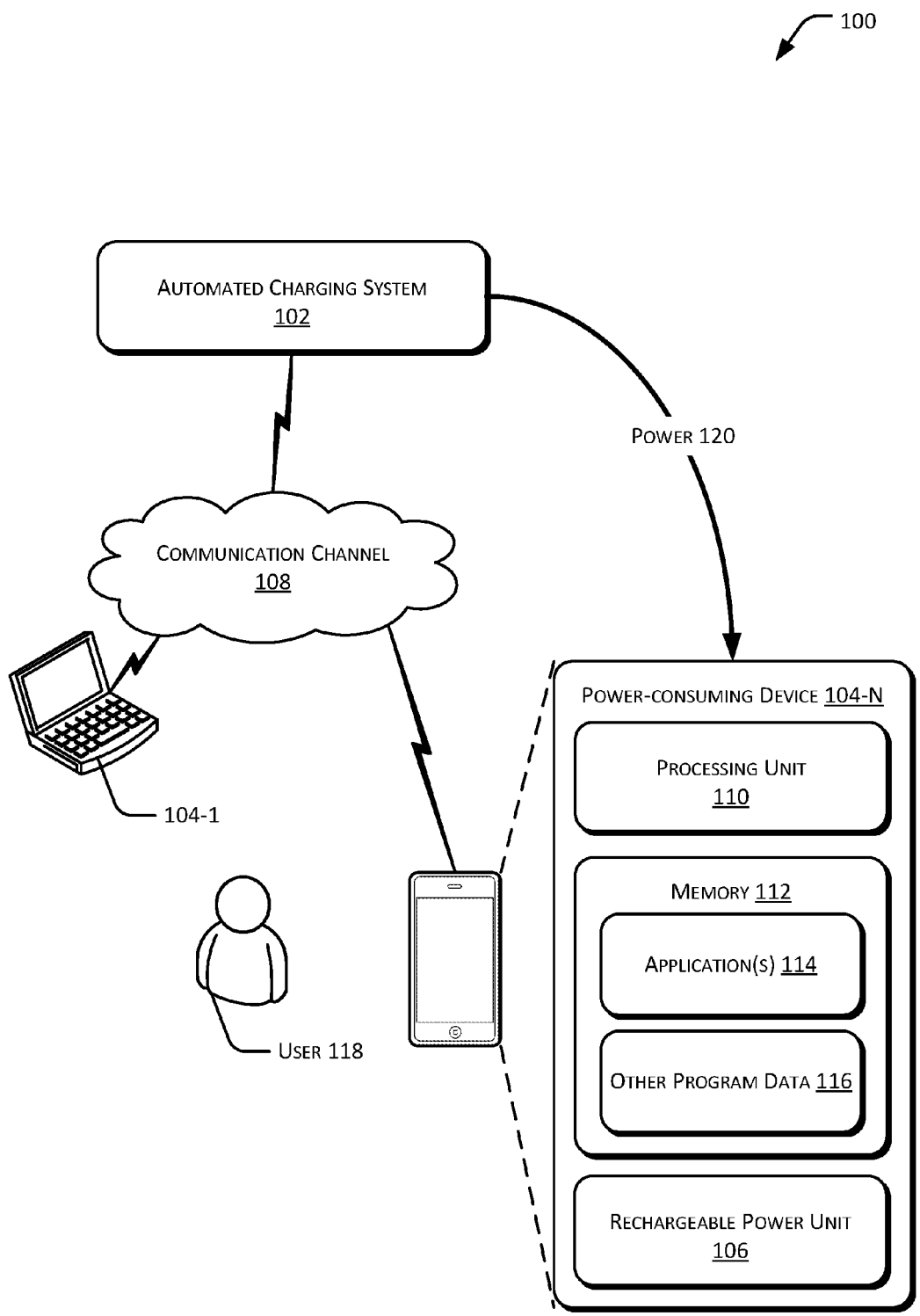
FIG. 1 illustrates an example environment of an automated charging system.

As noted above, charging or recharging power-consuming devices does not only require users of these devices to determine when to recharge the power-consuming devices, but also requires the user to carry or buy additional rechargers for each power-consuming device.

This disclosure describes an automated charging system (or a charging device). The automated charging system automatically determines when and/or whether to recharge a power-consuming device without requiring user intervention and/or instruction. Furthermore, the automated charging system may act as a universal recharger or charger that may be configured to recharge power-consuming devices of a plurality of types and/or models, including, for example, mobile phones of different models, tablets of different models, laptops of different models, etc. For example, the automated charging system may scan or search its neighboring environment to detect the presence of any power-consuming devices. In some embodiments, the automated charging system may scan or search for the presence of a power-consuming device using machine vision and recognizing objects that appear to be power-consuming devices. Additionally or alternatively, the automated charging system may detect the presence of a power-consuming device by detecting or receiving wireless signals, such as radio signals, broadcast by the power-consuming device.

The automated charging system may distinguish a power-consuming device that needs to receive power from the automated charging system from a power-consuming device that does not need to receive power (e.g., a fully or mostly charged device). In one embodiment, the automated charging system may identify the power need of a power-consuming device by wirelessly determining whether the power-consuming device is due for recharging. The power-consuming device may present or broadcast a need for power so that the automated charging system can automatically detect that need without user input or intervention. For example, a power-consuming device may transmit a radio signal indicating a need for power. The power-consuming device may also indicate a need for recharging by lights, sounds, or other externally-detectable signals. Once the automatic charging system recognizes that a particular power-consuming device needs power, the automatic charging system may charge the power-consuming device. The automatic charging system may cease charging the power-consuming device after the power-consuming device is fully charged or removed from a neighborhood of the automated charging system.

In one embodiment, the automated charging system may determine a status of a power level of the power-consuming device without direct and/or physical contact with the power-consuming device, e.g., by sending a signal to a power monitoring unit associated with the power-consuming device. The power monitoring unit may then signal a response back to the automated charging system, indicating or communicating the status of the power level of the power-consuming device. As mentioned above, the power monitoring unit may signal the response back to the automated charging system wirelessly and/or contactlessly (i.e., without direct and/or physical contact) by using radio signals, light, sound, or another technique. The response may include, for example, an indication whether the power level of the power-consuming device is less than a predetermined threshold, an indication whether the power-consuming device is in need of recharging, etc.

In one embodiment, the automated charging system may determine whether to recharge the power-consuming device based on the response. In response to determining that the power-consuming device is in need of recharging, the automated charging system may automatically initiate charging of the power-consuming device. The charging of the power-consuming device may be implemented wirelessly and/or contactlessly (i.e., without a charging cable). The automated charging system may use techniques such as directing a light source onto a photovoltaic cell, inductive charging, or the like to send power to a power generation unit that is associated with the power-consuming device to recharge the power-consuming device. Thus, the power generation unit may be configured, for example, as a photovoltaic cell or an induction coil. In some embodiments, the power-consuming device may generate a distinct indication that charging the power-consuming device has been completed (i.e., the power-consuming device is fully charged) from the power monitoring unit upon completion of the charging of the power-consuming device.

The foregoing embodiments describe the use of a power monitoring unit and a power generation unit with a power-consuming device. In one embodiment, the power monitoring unit and/or the power generation unit may be part of the power-consuming device. In other embodiments, the power monitoring unit and/or the power generation unit may be independent or separable components attachable to the power-consuming device. For example, the power monitoring unit and/or the power generation unit may be included or integrated in an accessory of the power-consuming device. The power monitoring unit and/or the power generation unit may then be attached to the power-consuming device upon incorporating the accessory to the power-consuming device.

The described automated charging system automatically detects a presence of a power-consuming device and determines a status of a power level of the power-consuming device wirelessly and/or contactlessly. Upon determining that the power level of the power-consuming device is low (e.g., less than a predetermined threshold), the automated charging system may automatically charge the power-consuming device without user intervention and/or instruction.

The application describes multiple and varied implementations and embodiments. The following section describes an example framework that is suitable for practicing various implementations. Next, the application describes example systems, devices, and processes for implementing an automated charging system.

Example Environment

FIG. 1 illustrates an example environment 100 usable to implement an automated charging device or system. The environment 100 may include an automated charging device or system 102 (which may include a single charging device or multiple different devices/components). The environment 100 may further include one or more power-consuming devices 104-1, . . . , 104-N (or collectively called power-consuming devices 104), where N is an integer greater than or equal to one. In this example, the automated charging system 102 is described as implemented by a single device or entity. In some embodiments, however, the functions of the automated charging system 102 may be implemented in multiple devices or entities which are connected to each other via one or more wireless connections and/or wired connections.

The power-consuming device 104 (as illustrated using the power-consuming device 104-N) may include a device that contains or is otherwise associated or connected to a rechargeable power unit 106, such as a rechargeable battery. In one embodiment, the power-consuming device 104 may be implemented as any of a variety of conventional computing devices including, but are not limited to, a notebook or portable computer, a handheld device, a netbook, an Internet appliance, a tablet or slate computer, a mobile device (e.g., a mobile phone, a personal digital assistant, a smart phone, etc.), a game console, a set-top box, etc. or a combination thereof. Additionally or alternatively, the power-consuming device 104 may be implemented as any of a variety of non-computing, powered devices that include a rechargeable power unit 106. Examples of the non-computing, powered device may include, but are not limited to, a portable music player, a portable video player, a voice recorder, a beauty product (e.g., an electric toothbrush, an electric razor, a hair dryer, etc.), a flashlight, a walky-talky, a game controller, a remote control, a cordless microphone, a cordless keyboard, a garage door opener, a power tool, a medical device, etc.

In some embodiments, the environment 100 may further include a communication channel 108. The automated charging system 102 may communicate data with the power-consuming device 104 via the communication channel 106. In one embodiment, the communication channel 106 may include a short-range communication channel. Examples of the short-range communication channel may include, but are not limited to, infrared communication, radio-frequency identification (RFID), Bluetooth, WiFi, WiFi Direct, ZigBee, infrared data association (IrDA), high-frequency modulated visible light and/or modulated audio. Additionally or alternatively, the short-range communication channel may further include near field communication (NFC) which is a short-range high frequency wireless communication technology enabling exchange of data between devices over a short distance, e.g., ten centimeters. NFC is a technology stack built on the four part ISO/IEC 14443 radio standard combined with ISO/IEC 18092.

In one embodiment, if the power-consuming device 104 includes a conventional computing device as described in the foregoing description, the power-consuming device 104 may include a processing unit 110 (such as one or more processors, microcontrollers, microprocessors, field-programmable gate arrays (FPGAs), etc.) coupled to memory 112. The memory 112 may include one or more applications or services 114 (e.g., power management application that manages power consumption of the power-consuming device 104, power monitoring application that monitor a power level of the power-consuming device 104, etc.) and other program data 116. The memory 112 may include volatile memory, such as Random Access Memory (RAM) and/or non-volatile memory, such as read only memory (ROM) or flash RAM. The memory 112 is an example of computer-readable media. Computer-readable media includes at least two types of computer-readable media, namely computer storage media and communications media.

Computer storage media includes volatile and non-volatile, removable and non-removable media implemented in any method or technology for storage of information such as computer readable instructions, data structures, program modules, or other data. Computer storage media includes, but is not limited to, phase change memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device.

In contrast, communication media may embody computer readable instructions, data structures, program modules, or other data in a modulated data signal, such as a carrier wave, or other transmission mechanism. As defined herein, computer storage media does not include communication media.

Alternatively, if the power-consuming device 104 includes a non-computing, powered device (e.g., a portable, powered device), the power-consuming device 104 may or may not include the processing unit 110 and/or the memory 112.

In one embodiment, a user 118 may have one or more power-consuming devices 104. The user 118 may place the one or more power-consuming devices 104 in one or more places or locations that are within a detectable range of the automated charging system 102. Upon detecting multiple power-consuming devices 104, the automated charging system 102 may determine the respective power levels of the one or more power-consuming devices 104 wirelessly and/or contactlessly. If the automated charging system 102 determines that one or more of the power-consuming devices 104 are in need of recharging (such as the power levels are less than a threshold power level, for example), the automated charging system 102 may start charging the power-consuming devices as shown by the transfer of power 120 from the automated charging system 102 to the power-consuming device 104. In some embodiments, the automated charging system 102 may begin charging the power-consuming device 104 that has the lowest power level first before charging any of the other power-consuming devices. In other embodiments, based on the types of charging technology used and/or relative locations of the power-consuming devices 104, for example, the automated charging system 102 may charge multiple power-consuming devices 104 simultaneously. In some embodiments, the multiple power-consuming devices 104 may be owned and/or used by multiple users.

Example Power-Consuming Device

Figure 2:
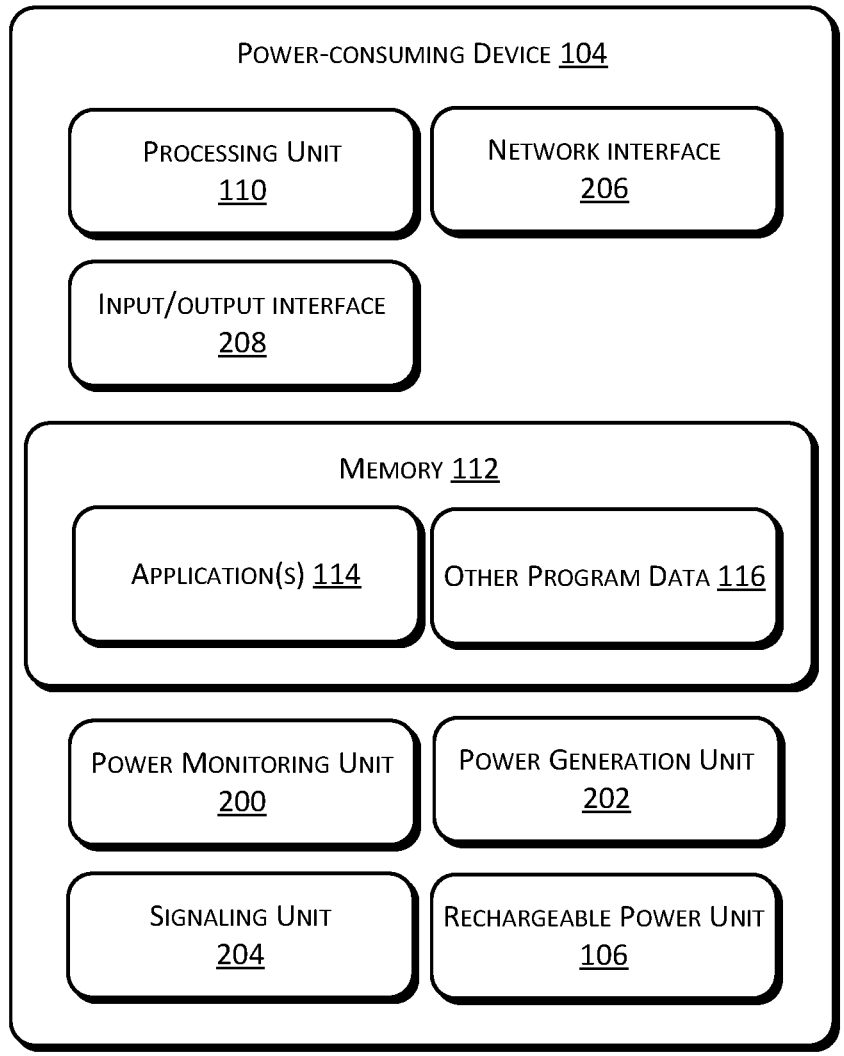
FIG. 2 illustrates an example power-consuming device of FIG. 1 in more detail.

FIG. 2 illustrates the example power-consuming device 104 in more detail. In one embodiment, the power-consuming device 104 may include a power monitoring unit 200, a power generation unit 202 and a signaling unit 204. Furthermore, in this example, the power-consuming device 104 may include a rechargeable power unit 106. In other instances, however, the rechargeable power unit 106 may not be included in the power-consuming device 104 but be associated with or connected to the power-consuming device 104, for example, via a wired connection (e.g., a plug-in battery pack). In other instances, the power-consuming device 104 may lack the rechargeable power unit 106 and consume power as the power is generated by the power generation unit 202.

In some instances, the power-consuming device 104 (e.g., a computing device such as a tablet, etc.) may further include a processing unit 110 and memory 112. Additionally, the power-consuming device 104 may further include a network interface 206 and/or an input/output interface 208. The processing unit 110 may be configured to execute instructions received from the network interface 206, received from the input/output interface 208, and/or stored in the memory 112. The memory 112 may include computer-readable media, such as computer storage media. In some embodiments, the memory 112 may further include one or more services or applications 114 (e.g., power management application, etc.) and program data 116. The program data 116 may store information of a current power level of the power-consuming device 104, information of the power-consuming device 104, such a type and a model of the power-consuming device 104, etc.

Although in this example, the power-consuming device 104 is described to include the power monitoring unit 200, the power generation unit 202 and the signaling unit 204, in some instances, the power monitoring unit 200, the power generation unit 202 and/or the signaling unit 204 may be independent or separable entities that are attachable to the power-consuming device 104. For example, the power monitoring unit 200, the power generation unit 202 and/or the signaling unit 204 may be provided to the power-consuming device 104 as an accessory or may be included, incorporated or integrated in an accessory for the power-consuming device 104. For example, the power monitoring unit 200, the power generation unit 202 and/or the signaling unit 204 may be part of an accessory (such as a phone case including an integrated microcontroller for the power monitoring unit 200, a photovoltaic cell for the power generation unit 202, and/or a LED unit for the signaling unit 204, for example) for a power-consuming device 104 (such as a mobile phone). The power monitoring unit 200, the power generation unit 202 and/or the signaling unit 204 may be attached or incorporated to the power-consuming device 104 when the accessory is attached or incorporated to the power-consuming device 104. In some instances, the power monitoring unit 200, the power generation unit 202 and/or the signaling unit 204 may be connected or integrated together as a single entity.

When the power monitoring unit 200, the power generation unit 202 and/or the signaling unit 204 are independent or separable components or accessories for the power-consuming device 104, the power monitoring unit 200, the power generation unit 202 and/or the signaling unit 204 may include or be associated (or connected) with circuitry that enables the power monitoring unit 200, the power generation unit 202 and/or the signaling unit 204 to connect directly or indirectly to a rechargeable power unit 106 associated with the power-consuming device 104 for determining a status of a power level of the rechargeable power unit 106 and/or charging the rechargeable power unit 106. Additionally or alternatively, the circuitry may enable the power monitoring unit 200 to communicate data with the power-consuming device 104 (e.g., the power management application, etc.) and/or enable the power monitoring unit 200 to use some functions and/or components (e.g., Bluetooth®, infrared communication interface, etc.) of the power-consuming device 104.

In one embodiment, the power generation unit 202 may generate power upon interacting with the automated charging system 102. The power generation unit 202 may additionally be able to generate power in response to manual actions implemented by a user (e.g., plugging in a power cord). By way of example and not limitation, the power generation unit 202 may include a photovoltaic or solar panel or film. The power generation unit 202 may generate power (or convert the light energy into electrical energy) upon receiving a light beam from the automated charging system 102. Additionally or alternatively, the power generation unit 202 may include an induction component (such as an induction coil). The power generation unit 202 may generate electrical current or power from electromagnetic field produced by the automated charging system 102 based on inductive coupling. In one embodiment, the power generation unit 202 may supply the power to the power monitoring unit 200, the signaling unit 204 and/or the rechargeable power unit 106 associated with the power-consuming device 104.

In some embodiments, the power monitoring unit 200 may receive power directly from the power generation unit 202 without drawing or receiving power from other components of the power-consuming device 104 such as the rechargeable power unit 106, thus avoiding to consume power from the rechargeable power unit 106 which power level may be uncertain and/or unreliable (e.g., a low or depleted power level, such as 1%, 5% power level, etc.). In other embodiments, the power monitoring unit 200 may draw power from the rechargeable power unit 106 of the power-consuming device 104. In some instances, the power-consuming device 104 may receive power from both the rechargeable power unit 106 and the power generation unit 202. In one embodiment, the power monitoring unit 200 may remain in a low-power mode (such as a sleep or hibernate mode, etc.), a powered-off mode, or an inoperative mode unless the power monitoring unit 200 receives power from either the power generation unit 202 or the rechargeable power unit 106 so that the power monitoring unit 200 may not continuously draw power from the power generation unit 202 or the rechargeable power unit 106 and thus waste the power. For example, the power monitoring unit 200 may be powered up and start to perform an operation upon receiving power from the power generation unit 202 or from the rechargeable power unit 106.

In one embodiment, the power monitoring unit 200 may be configured to determine a status of a power level of the power-consuming device 104 (or the rechargeable power unit 106 associated therewith). The status of the power level may include, but is not limited to, whether a power level of the power-consuming device 104 or the rechargeable power unit 106 is less than a predefined threshold, whether the power-consuming device 104 or the rechargeable power unit 106 is in need of recharging, etc. For example, the predefined threshold may be a power level of less than 90% of a full charge for the rechargeable power unit 106, less than 80% of a full charge for the rechargeable power unit 106, less than 70% of a full charge for the rechargeable power unit 106, less than 60% of a full charge for the rechargeable power unit 106, less than 50% of a full charge for the rechargeable power unit 106, less than 40% of a full charge for the rechargeable power unit 106, less than 30% of a full charge for the rechargeable power unit 106, less than 20% of a full charge for the rechargeable power unit 106, less than 15% of a full charge for the rechargeable power unit 106, less than, 10% of a full charge for the rechargeable power unit 106, less than 5% of a full charge for the rechargeable power unit 106, or even less than 1% of a full charge for the rechargeable power unit 106. The power monitoring unit 200 may determine the status of the power level of the power-consuming device 104 from a reported power level provided by the application 114 (e.g., the power management application) and/or through circuitry connected to the rechargeable power unit 106. In some embodiments, the power monitoring unit 200 may query the status of the power level associated with the power-consuming device 104 upon receiving a signal from the automated charging system 102. Additionally or alternatively, the power monitoring unit 200 may query the status of the power level associated with the power-consuming device 104 when the power monitoring unit 200 is powered on or started up by the power generation unit 202 (e.g., after the power generation unit 202 interacts with the automated charging system 102 to generate power) or the rechargeable power unit 106.

Additionally or alternatively, the power-consuming device 104 (or one of the applications 114 such as the power management application) may determine that the power level of the rechargeable power unit 106 is low (e.g., less than a predefined threshold). The power-consuming device 104 (or one of the applications 114 such as the power management application) may power up the power monitoring unit 200 using the rechargeable power unit 106 and send a signal indicating the status of the power level to the power monitoring unit 200.

Upon determining the status of the power level of power-consuming device 104, the rechargeable power unit 106, the power monitoring unit 200 may be configured to signal a result to the automated charging system 102. For example, if the power monitoring unit 200 is powered up by the power generation unit 202 (e.g., after the power generation unit 202 generates power from the interaction with the automated charging system 102), the power monitoring unit 200 may signal a response indicating the status of the power level of the power-consuming device 104 to the automated charging system 102.

By way of example and not limitation, the signaling unit 204 may be configured to present an externally detectable signal, such as a light, sound, etc. In one instance, the signaling unit 204 may include one or more LEDs (light-emitting diodes of same or different colors). The power monitoring unit 200 may indicate each status of the power level of the power-consuming device 104 (e.g., the power level is low and in need of recharging) using a predefined light pattern emitted from the one or more LEDs. The predefined light pattern may include, for example, a predefined time duration of light emission from the one or more LEDs, a predefined color pattern from the one or more LEDs, etc. The power monitoring unit 200 instructs the signaling unit 204 to produce different predefined light patterns for different statuses.

In some instances, the signaling unit 204 may include a tone generator. The power monitoring unit 200 may instruct the signaling unit 204 to generate or create a predefined tone based on the status of the power level of the power-consuming device 104. The predefined tone may have a different pitch and/or a different time duration for each status of the power level. In one embodiment, the predefined tone for each status may be a tone that is not audible to humans so that the user 118 will not be disturbed.

In one embodiment, the power monitoring unit 200 may be powered up by the rechargeable power unit 106 in order for the power monitoring unit 200 to check the status of the power level whether the automated charging system 102 is or is not located in the neighborhood of the power-consuming device 104. In this case, the power monitoring unit 200 may still instruct the signaling unit 204 to signal the power level (e.g., indicating that the power-consuming device 104 is in need of recharging) as described in the foregoing embodiments. If the power-consuming device 104 (or the power monitoring unit 200 or the power generation unit 202) does not receive a response from the automated charging system 102 after some period of time (e.g., a predetermined period of time set during configuration of the power-consuming device 104), the power monitoring unit 200 may then be powered off without storing information of the status of the power level of the power the rechargeable power unit 106. In other embodiments, the power monitoring unit 200 may store the result (i.e., the status of the power level) in a storage associated therewith, for example, and power off. If the power monitoring unit 200 is powered or started up at a later time, the power monitoring unit 200 may check if information related to the status of the power level is stored in the storage and signal a response to the automated charging system 102 with or without further determining a current status of the power level of the power-consuming device 104 or the rechargeable power unit 106. In some embodiments, the power-consuming device 104 (e.g., by use of one of the applications 114) may directly store information about a current status of the power level into the storage without powering or waking up the power monitoring unit 200, allowing the power monitoring unit 200 to check or obtain information of the status of the power level directly from the storage rather than from the rechargeable power unit 106.

In one embodiment, if the power monitoring unit 200 determines that the power-consuming device 104 (or the rechargeable power unit 106) is not in need of recharging (e.g., the power level is greater than or equal to a predefined level, etc.), the power monitoring unit 200 may instruct the signaling unit 206 to generate a signal indicating that charging is not necessary. The power monitoring unit 200 may then return to a sleep, hibernate, standby, or similar mode until activated again by a component or accessory of the power-consuming device 104 such as the power generation unit 202.

Alternatively, if the power monitoring unit 200 determines that the power-consuming device 104 (i.e., the rechargeable power unit 106) is due for recharging (e.g., the power level is less than the predefined level, etc.), the power monitoring unit 200 may instruct the signaling unit 206 to generate a signal indicating that the power-consuming device 104 is in need of recharging. Upon signaling the need for recharging, the automated charging system 102 may direct power 120 to the power generation unit 202. For example, the power generation unit 202 may receive a light beam (or electromagnetic field for inductive or wireless charging, etc.) from the automated charging system 102 to generate electrical current or power for charging the rechargeable power unit 106 of the power-consuming device 104.

In one embodiment, the power generation unit 202 may include or be associated with circuitry (not shown) that enables the power generation unit 202 to charge the rechargeable power unit 106 of the power-consuming device 104. For example, if the power-consuming device 104 is a mobile phone, the circuitry and the power generation unit 202 is an independent or separable component from the power-consuming device 104, the circuitry may include a circuitry connecting a power output of the power generation unit 202 to a slot that a normal charger connects to the power-consuming device (e.g., the mobile phone in this example) for charging. In one embodiment, after signaling the result or response indicating a need for recharging to the automated charging system 102, the power generation unit 202 provides power to the rechargeable power unit 106 of the power-consuming device 104. In some embodiments, the power monitoring unit 200 may direct the circuitry to deliver the electrical current or power generated by the power generation unit 202 to the rechargeable power unit 106 of the power-consuming device 104.

In one embodiment, the power monitoring unit 200 may monitor a current power level or a change in the power level of the rechargeable power unit 106 after the signaling unit 204 has generated a signal for detection by the automated charging system 102. If the power monitoring unit 200 determines that the current power level is not changing and/or is changing at a rate less than a predetermined rate threshold (e.g., a charge rate of C/5, C/10, C/15, C/20, etc., where C represents a charge rate for charging the rechargeable power unit 106 to its full capacity or power level in a specific time duration, e.g., one hour) after a predetermined period of time (e.g., one minutes, five minutes, ten minutes, etc.), the power monitoring unit 200 may determine that the power generation unit 202 fails to receive enough interaction (e.g., enough light beam) from the automated charging system 102. This may happen when the light beam from the automated charging system 102 fails to shine properly on the photovoltaic or solar panel or film of the power generation unit 202 or an intensity of the light beam is low, for example. In response to determining that the current power level is not changing as expected, the power monitoring unit 200 may direct the signaling unit 204 to signal a response (e.g., a light pattern having a predefined time duration or color representing this situation) to the automated charging system 102, causing the automated charging system 102 to reorient the light beam to a new direction or area on the power generation unit 202 of the power-consuming device 104 power generation unit 202 or increase the intensity of the light beam, for example. The lack of charging or slow charging even after the signaling unit 206 has "requested" power may indicate that the power generation unit 202 is failing to generate power from the interaction with the automated charging system 102. The power monitoring unit 200 may repeatedly request the signaling unit 206 to signal an indication that the power generation unit 202 is failing to generate enough power from the interaction until the power monitoring unit 200 determines that the current power level changes and/or changes at a rate greater than or equal to the predetermined rate threshold.

In one embodiment, the power generation unit 202 may continue to charge the power-consuming device 104 (e.g., the rechargeable power unit 106) as long as the power generation unit 202 interacts with the automated charging device 102 (such as receiving the light beam from the automated charging device 102, for example). Additionally or alternatively, the power generation unit 202 may continue to charge the power-consuming device 104 until the power-consuming device 104 is found to be fully charged. For example, the power-consuming device 104 (e.g., the power management application 114) may regularly monitor a current power level of the rechargeable power unit 106 and detect that the rechargeable power unit 106 is fully charged. In response to detecting that the power chargeable unit is fully charged, the power-consuming device 104 (or the power management application 114) may send a signal to the power monitoring unit 200, indicating that the rechargeable power unit 106 has been fully charged. After receiving the signal, the power monitoring unit 200 may signal a response indicating that the rechargeable power unit 106 has been fully charged to the automated charging system 102 via, for example, the signaling unit 204. The power generation unit 202 may then cease generating and/or delivering power to recharge the power-consuming device 104 (or the rechargeable power unit 106) after the automated charging system 102 ceases interacting with the power generation unit 202.

Additionally or alternatively, the power monitoring unit 200 may regularly determine a current power level of the power-consuming device 104 and signal (via the signaling unit 204) the response indicating that the power-consuming device 104 is fully charged to the automated charging system 102 via the signaling unit 204, for example. The power generation unit 202 may then cease generating and/or delivering power to recharge the power-consuming device 104 after the automated charging system 102 ceases interacting with the power generation unit 202. This will save the automated charging system 102 from wasting energy and may also free the automated charging system 102 to search for another power-consuming device 104 that is due for recharging, etc.

Although in the foregoing embodiments, the power-consuming device 104 (or the power management application therein, for example) and/or the power monitoring unit 200 may determine a current status of the power level of the rechargeable power unit 106, in other embodiments, the power-consuming device 104 (or the power management application therein, for example) and/or the power monitoring unit 200 may not determine the power level of the rechargeable power unit 106. Thus, the power-consuming device 104 may avoid wasting energy by not determining the power level.

Example Automated Charging System

Figure 3:
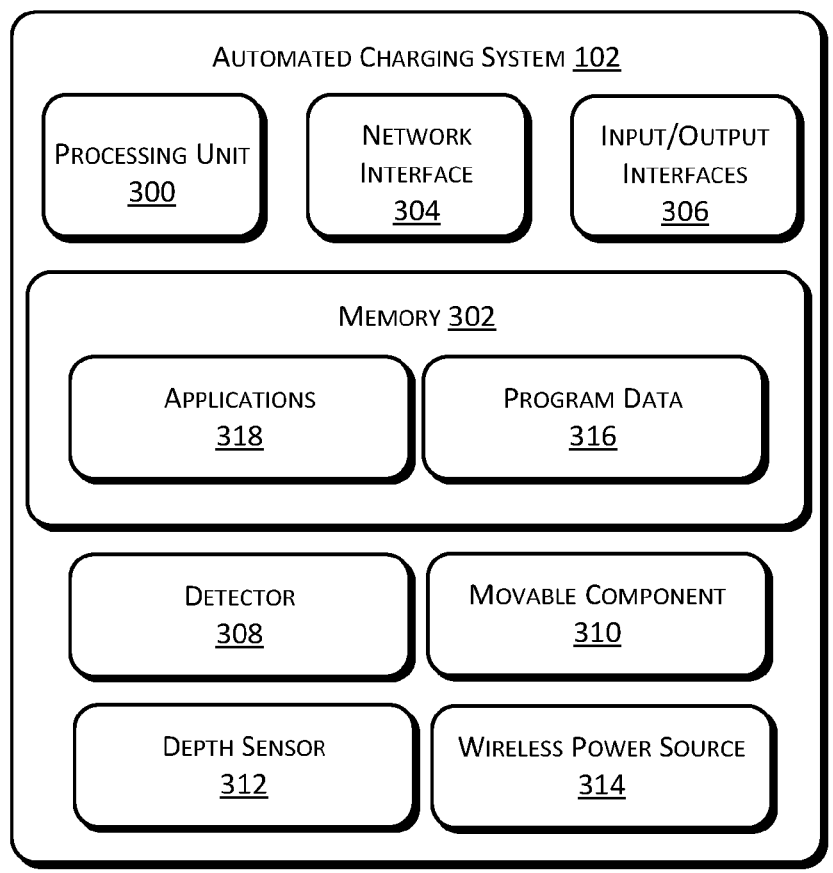
FIG. 3 illustrates an example automated charging system of FIG. 1 in more detail.

FIG. 3 illustrates the example automated charging system 102 in more detail. In one embodiment, the automated charging system 102 includes, but is not limited to, a processing unit 300 (such as a microcontroller, a microprocessor, one or more processors, application-specific integrated circuit, etc.) and memory 302. In some embodiments, the automated charging system 102 may further include a network interface 304. Additionally or alternatively, the automated charging system 102 may include an input/output interface 306. The processing unit 300 is configured to execute instructions received from the network interface 304, received from the input/output interface 306, and/or stored in the memory 302. The memory 302 may include computer-readable media, such as computer storage media.

In one embodiment, the automated charging system 102 may include a detector 308. The detector 308 may be configured to detect a presence of a power-consuming device 104 in a neighborhood of the detector 308 or the automated charging system 102. For example, the user 118 may place the power-consuming device 104 in a designated area which is located within a detectable range or scope of the detector 308 to enable detection of the power-consuming device 104. In one embodiment, the detector 308 may include an image sensor such as a camera. In this example, the detector 308 may capture a scene using the image sensor and recognize the presence of the power-consuming device 104 based on object recognition or detection. Examples of object recognition or detection may include conventional object recognition or detection, such as template-based recognition or detection, feature-based recognition or detection, appearance-based recognition or detection, etc. In one embodiment, the detector 308 may employ a tailored algorithm for recognizing or detecting a specific type of power-consuming device 104. An example object recognition or detection algorithm for mobile phones (such as smartphones) will be given in a subsequent section for illustration purpose.

In some embodiments, the detector 308 may additionally or alternatively include a signal detector. The detector 308 may detect the presence of the power-consuming device 104 using the signal detector by receiving a signal from the power-consuming device 104 or the power monitoring unit 200 associated with the power-consuming device 104 via the communication channel 106. For example, a power-consuming device 104 (or a power monitoring unit 200 associated with the power-consuming device 104) may have a communication unit (such as Bluetooth®, etc.) turned on. The detector 308 may receive a Bluetooth® signal and determine that the power-consuming device 104 is present within a neighborhood of the detector 308 and/or the automated charging system 102.

In some embodiments, the detector 308 may further include or be associated with a movable component 310 (such as a movable part equipped with rotational and/or translational motors, etc.). The movable component 310 enlarges a detectable range or scope of the detector 308 by enabling the detector 308 (e.g., the image sensor) to scan across different regions for detection of the power-consuming device 104. Additionally or alternatively, the movable component 310 may further enable the detector 308 to track the power-consuming device 104, e.g., when the user 118 moves the power-consuming device 104 from one location to another location within the detectable range or scope of the detector 308. In some embodiments, the movable component 310 may move the detector 308 continuously or periodically. In some instances, the movable component 310 may move the detector 308 in response to detecting a motion (e.g., a movement of an object such as the power-consuming device 104 or a hand of the user 118, etc.) within the detectable range or scope of the detector 308.

Although in the foregoing examples, the detector 308 detects the presence of the power-consuming device 104 without intervention and/or instruction of the user 118, in some embodiments, the detector 308 may detect the presence of the power-consuming device 104 in response to detecting a gesture from the user 118. For example, the user 118 may perform a predefined gesture (such as waving the power-consuming device 104, etc.) within the detectable range or scope of the detector 308 to initiate or activate the detector 308 to search for the presence of the power-consuming device 104. Additionally or alternatively, the user 118 may provide a voice command (e.g., voicing out one or more words and/or tones such as "search", etc.) to initiate or activate the detector 308 (which may include a voice detector or microphone in this example) to search for the presence of the power-consuming device 104. The detector 308 may then perform a search for the power-consuming device 104 as described in the foregoing embodiments.

Additionally or alternatively, the automated charging system 102 may determine a location of the power-consuming device 104. By way of example and not limitation, the automated charging system 102 may determine the location of the power-consuming device 104 based on one or more images captured by the detector 308 (e.g., the image sensor). Additionally or alternatively, the automated charging system 102 may estimate or determine a size of the power-consuming device 104 using a depth sensor 312 (e.g., a depth camera, dual cameras, etc.). In one embodiment, the automated charging system 102 may or may not determine an exact location of the power-consuming device 104 but may estimate or determine a direction from the automated charging system 102 to the power-consuming device 104.

Additionally or alternatively, the automated charging system 102 may, in one instance, determine whether the power-consuming device 104 is a power-consuming device rechargeable by the automated charging system 102 and/or the power-consuming device 104 is compatible with the automated charging system 102. For example, the automated charging system 102 may determine whether the power-consuming device 104 is a power-consuming device rechargeable by the automated charging system 102 and/or the power-consuming device 104 is compatible with the automated charging system 102 after detecting the presence of the power-consuming device 104. In one instance, the automated charging system 102 may determine whether the power-consuming device 104 is a power-consuming device rechargeable by the automated charging system 102 and/or the power-consuming device 104 is compatible with the automated charging system 102 by recognizing what the power-consuming device 104 is. For example, the automated charging system 104 may recognize what the power-consuming device 104 is based on recognizing a type and/or a model of the power-consuming device 104 from an image captured by the detector 308. The detector 308 may match the power-consuming device 104 against information associated with one or more compatible and/or allowable power-consuming devices 104 stored in the memory 302.

Additionally or alternatively, the automated charging system 102 may determine whether the power-consuming device 104 is a power-consuming device rechargeable by the automated charging system 102 and/or the power-consuming device 104 is compatible with the automated charging system 102 by exchanging data with the power monitoring unit 200 and/or the power-consuming device 104. The automated charging system 102 receives a signal from the power monitoring unit 200 and/or the power-consuming device 104, and may determine that the power-consuming device 104 is a power-consuming device rechargeable by the automated charging system 102 and/or the power-consuming device 104 is compatible with the automated charging system 102 if the signal matches a defined signal stored in the memory 302.

In one embodiment, the automated charging system 102 may or may not determine whether the power-consuming device 104 is a power-consuming device rechargeable by the automated charging system 102 and/or the power-consuming device 104 is compatible with the automated charging system 102. Upon detecting the power-consuming device 104, the automated charging system 102 may send or direct a signal to the power-consuming device 104 and wait for a response from the power-consuming device 104. If the automated charging system 102 does not receive a response from the power-consuming device 104 after a predetermined period of time (e.g., ten seconds, etc.), the automated charging system 102 may ignore this power-consuming device 104. Additionally or alternatively, the automated charging system 102 may determine or conclude that the power-consuming device 104 is not a power-consuming device rechargeable by the automated charging system 102 and/or the power-consuming device 104 is not compatible with the automated charging system 102.

In some embodiments, if the automated charging system 102 receives a response from the power-consuming device 104, the automated charging system 102 may determine whether the response is a predefined response (e.g., a predefined light pattern, etc.) stored in the memory 302. If the response is a predefined response, the automated charging system 102 may determine or conclude that the power-consuming device 104 is a power-consuming device rechargeable by the automated charging system 102 and/or the power-consuming device 104 is compatible with the automated charging system 102. Otherwise, the automated charging system 102 determines or concludes that the power-consuming device 104 is not a power-consuming device rechargeable by the automated charging system 102 and/or the power-consuming device 104 is not compatible with the automated charging system 102.

By way of example and not limitation, the automated charging system 102 may include a wireless power source 314. The wireless power source 314 is configured to provide power to the power-consuming device 104 and/or the power generation unit 202 associated with the power-consuming device 104 wirelessly and/or contactlessly. In one embodiment, the wireless power source 314 may include, but is not limited to, a light beam generator, an induction charger, etc. The light beam generator may include, but is not limited to, a flashlight, an infrared light generator, etc. In one embodiment, the light beam generator may generate a light beam that is invisible to human eyes, such as infrared light, etc. This may avoid damaging the human eyes due to high intensity of the light beam. In other embodiments, the light beam generator may generate a light beam that is visible to human eyes, enabling the user 118 to be aware that an interaction between the automated charging system 102 and the power-consuming device 104 is in process. This allows the user 118 to interfere the interaction if desirable to the user 118. For example, the user 118 may interfere the interaction by relocating or orienting the power-consuming device 104 (or the power generation unit 202 associated with the power-consuming device 104) towards an area illuminated by the light beam generated by the light beam generator, etc.

In one embodiment, the automated charging system 102 may direct the light beam generator to generate or send a light beam aiming at the power-consuming device 104 (or the power generation unit 202 associated with the power-consuming device 104). In some embodiments, the automated charging system 102 may further direct the movable component 310 to orient and/or move the light beam generator so that the light beam generator may aim the light beam at the power-consuming device 104 (or the power generation unit 202 associated with the power-consuming device 104).

In one embodiment, the automated charging system 102 may wait for a predetermined period of time (such as ten seconds, thirty seconds, a minute, for example). If the automated charging system 102 does not receive a response, the automated charging system 102 may determine that the power-consuming device 104 is not a power-consuming device rechargeable by the automated charging system 102 and/or the power-consuming device 104 is not compatible with the automated charging system 102 as described in the foregoing embodiments.

In some embodiments, if the automated charging system 102 does not receive a response from the power-consuming device 104 (or the signaling unit 204), the automated charging system 102 may reorient and/or move the light beam generator using the movable component 310, send a light beam to the power-consuming device 104 (or the power generation unit 202 associated with the power-consuming device 104), and wait for a response to be received. The automated charging system 102 may repeat these operations until a response is received or a predefined number of times is met in order to statistically avoid a false negative due to a potential failure or error in directing the light beam at the power-consuming device 104 (or the power generation unit 202 associated with the power-consuming device 104). A false negative corresponds to mistakenly ignoring the power-consuming device and/or determining that the power-consuming device 104 is not a power-consuming device rechargeable by the automated charging system 102 and/or the power-consuming device 104 is not compatible with the automated charging system 102 when the power-consuming device 104 is indeed a power-consuming device rechargeable by the automated charging system 102 and/or the power-consuming device 104 is compatible with the automated charging system 102.

In one embodiment, the automated charging system 102 may receive a response (e.g., a light pattern emitted from one or more LEDs associated with the power-consuming device 104 as described in the foregoing embodiments, etc.) from the power-consuming device 104 within the predetermined period of time. The automated charging system 102 may then determine whether the response corresponds to a response predefined and stored in the memory 302. If not, the automated charging system 102 may ignore the power-consuming device 104 and search for another power-consuming device 104, for example. Alternatively, if determining that the response corresponds to a predefined response, the automated charging system 102 may determine whether the response corresponds to an indication that the power-consuming device 104 is in need of recharging. If determining that the response corresponds to such indication, the automated charging system 102 may start charging the power-consuming device 104 wirelessly and/or contactlessly. In other embodiments, if the response indicates that the power level of the power-consuming device 104 (or the rechargeable power unit 106 thereof) is greater than a predetermined threshold (or the power-consuming device 104 does not need recharging at this moment), the automated charging system 102 may search for another power-consuming device 104 or may automatically turn to an idle or hibernation mode. The automated charging system 102 may automatically wake up after a predetermined period of time or upon detecting a motion in a neighborhood thereof.

In one embodiment, the automated charging system 102 may start charging the power-consuming device 104 wirelessly and/or contactlessly using the light beam generator. For example, the automated charging system 102 may direct the light beam generator to generate and send a light beam onto the power-consuming device 104 (or the power generation unit 202), causing the power generation unit 202 to generate power for charging the power-consuming device 104 (or the rechargeable power unit 106). In some embodiments, before and/or during sending the light beam onto the power-consuming device 104, the automated charging system 102 may direct the movable component 310 to orient or position the light beam generator to ensure the light beam fall on the power generation unit 202. The automated charging system 102 may achieve this operation using the detector 210 (e.g., by examining one or more images captured by the image sensors).

Additionally or alternatively, the automated charging system 102 or the detector 308 may detect a new response from the signaling unit 206 associated with the power-consuming device 104 and determine the new response indicating that the power generation unit 202 fails to generate power or fails to generate power at a rate greater than or equal to a predetermined rate threshold. The automated charging system 102 may determine a meaning of this new response based on information of predefined commands or responses stored in the memory 302. In response to determining that the power generation unit 202 fails to generate power or fails to generate power at a rate greater than or equal to the predetermined rate threshold, the automated charging system 102 may direct the movable component 310 to orient or position the light beam generator to ensure the light beam fall on the power generation unit 202. Additionally or alternatively, the automated charging system 102 may direct the light beam generator to increase an intensity of the light beam that is aimed at the power-consuming device 104 (or the power generation unit 202).

In some embodiments, the automated charging system 102 may employ the induction charger to energize the power generation unit 202 associated with the power-consuming device 104 to charge up the rechargeable power unit 106 wirelessly. In one embodiment, upon receiving the response indicating that the power-consuming device 104 is in need of recharging, the automated charging system 104 may activate or power up the induction charger to generate an electromagnetic field, thereby enabling the power generation unit 202 of the power-consuming device 104 to draw power from the electromagnetic field (through inductive coupling or resonant inductive coupling) and convert the power into an electrical current or power to charge the rechargeable power unit 106 of the power-consuming device 104. Similar to the foregoing embodiments for the light beam generator, in some embodiments, the automated charging system 102 may direct the induction charger to increase an intensity of the electromagnetic field generated if the automated charging system 102 receives or detects a response indicating that the power generation unit 202 fails to generate power or fails to generate power at a rate greater than or equal to the predetermined rate threshold.

In one embodiment, the automated charging system 102 may receive another response or signal from the signaling unit 204 or the power-consuming device 104, e.g., a light pattern emitted by one or more LEDs of the signaling unit 204. The automated charging system 102 may determine information of the response or signal based on, for example, information of predefined commands stored in the memory 302. For example, the automated charging system 102 may determine that the response or signal represents an indication that the power-consuming device 104 (or the rechargeable power unit 106) is fully charged or is charged to a predefined power level. In response to determining that the power-consuming device 104 (or the rechargeable power unit 106) is fully charged or is charged to a predefined power level, the automated charging system 102 may direct or instruct the wireless power source to cease operation or interaction with the power generation unit 202, or in other words, cause the light beam generator and/or the induction charger to shut off.

After finishing charging the power-consuming device 104, the automated charging system 102 (or the detector 308) may then search for another power-consuming device 104 for charging, or switch to another power-consuming device 104 which has previously been found for charging. Furthermore, although in the foregoing embodiments, the automated charging system 102 is described to charge a single power-consuming device 104 or charge multiple power-consuming devices 104 sequentially, in some embodiments, the automated charging system 102 may charge multiple power-consuming devices 104 concurrently. For example, the automated charging system 102 may include multiple wireless power sources (e.g., multiple light beam generators and/or multiple induction chargers), and employ these wireless power sources to concurrently charge multiple power-consuming devices 104 as found by the detector 308.

Furthermore, the automated charging system 102 may be a specific charging device or charger for a specific power-consuming device 104 (e.g., a specific model of Windows® smartphone) or a generic or universal charging device (or charger) for a plurality of power-consuming devices 104 of different types and/or models (e.g., smartphones of different brands, models, etc.). In one embodiment, the automated charging system 102 may store information of compatible power-consuming devices 104, the predefined responses or commands, etc., in program data 316. Additionally, the automated charging system 102 may include one or more applications 318 (such as control application, etc.) that control various components (such as the detector 308, the movable component 310, the depth sensor 312, the light beam generator and/or the induction charger, etc.) in the automated charging system 102 and communicate data among these components.

Example Object Detection Algorithm

Table 1 shows an example object recognition or detection algorithm for detecting a mobile phone (such as a smartphone). This example algorithm takes a RGB (red, green and blue) image captured by the detector 210 and converts the image into a grayscale image. The example algorithm may further convert the grayscale image into a binary image based on a predefined pixel intensity threshold (e.g., half of the highest allowable pixel intensity value). The example algorithm may then apply an edge detection algorithm (e.g., a Border-Following approach, a Canny edge detection algorithm, a Gabor filter, Hough transform, etc.) to extract edges of objects found in the binary image, with the edges of each object being represented in a respective set of points. Details of the Border-Following approach can be found at S. Suzuki, "Topological Structural Analysis of Digitized Binary Images by Border Following", Computer Vision, Graphics, and Image Processing, vol. 30, pp. 32-46, 1985.

TABLE 1

| | |
|---|---|
| 1. | // Input: RGB image and depth map thereof |
| 2. | // Output: One or more rectangles |
| 3. | RectangleDetection( ) |
| 4. | {Convert the RGB image into a grayscale image; |
| 5. | Binarize the grayscale image into a binary image; |
| 6. | Extract object edges from the binary image; |
| 7. | Compute convex hull of each object's edges; |
| 8. | Find out min-rectangle of each convex hull; |
| 9. | Look up depth values of each rectangle; |
| 10. | Calculate a size of each rectangle; |
| 11. | Filter out a rectangle that is outside a predefined size range; |
| 12. | Return remaining one or more rectangles;} |

Thereafter, the example algorithm computes a convex hull of the edges of each object using a Sklansky algorithm. A convex hull of edges of an object corresponds to the smallest convex polygon which encloses all the points of the edges of the object. Details of the Sklansky algorithm can be found at J. Sklansky, "Finding the Convex Hull of a Simple Polygon", *Pattern Recognition Letters*, vol. 1, no. 2, pp. 79-83, 1982. Upon obtaining a convex polygon, the example algorithm computes a rectangle (which is named herein a min-rectangle) of a minimum area that encloses the convex polygon. If a difference or a percentage of difference between an area of the convex polygon and an area of the min-rectangle is less than a predefined area threshold (e.g., less than 20% difference), the example algorithm may conclude that an object corresponding to the convex polygon is a rectangle object and has a high likelihood that the object is a smartphone. By tolerating an area difference, the example algorithm is able to detect smartphone that may not be a rectangle in shape.

In some embodiments, the example algorithm determines or estimates a physical size of the rectangle. In one embodiment, the example algorithm may obtain depth information (such as depth map, etc.) of the rectangle, for example, using the depth sensor 312. Based on the depth map, the example algorithm may compute physical height and width of the rectangle. The example algorithm may also include a predefined range of sizes for smartphones and determine whether a size of the rectangle falls within the predefined range. If the size of the rectangle falls outside the predefined range, the example algorithm may determine that the object is not a smartphone and remove this object from consideration. If the size of the rectangle falls within the predefined range, the example algorithm may consider the object associated with this rectangle as a potential candidate for smartphone and return information of this object (or the rectangle) to the automated charging system 102 for subsequent operations as described in the foregoing sections.

Example Methods

Figure 4A:
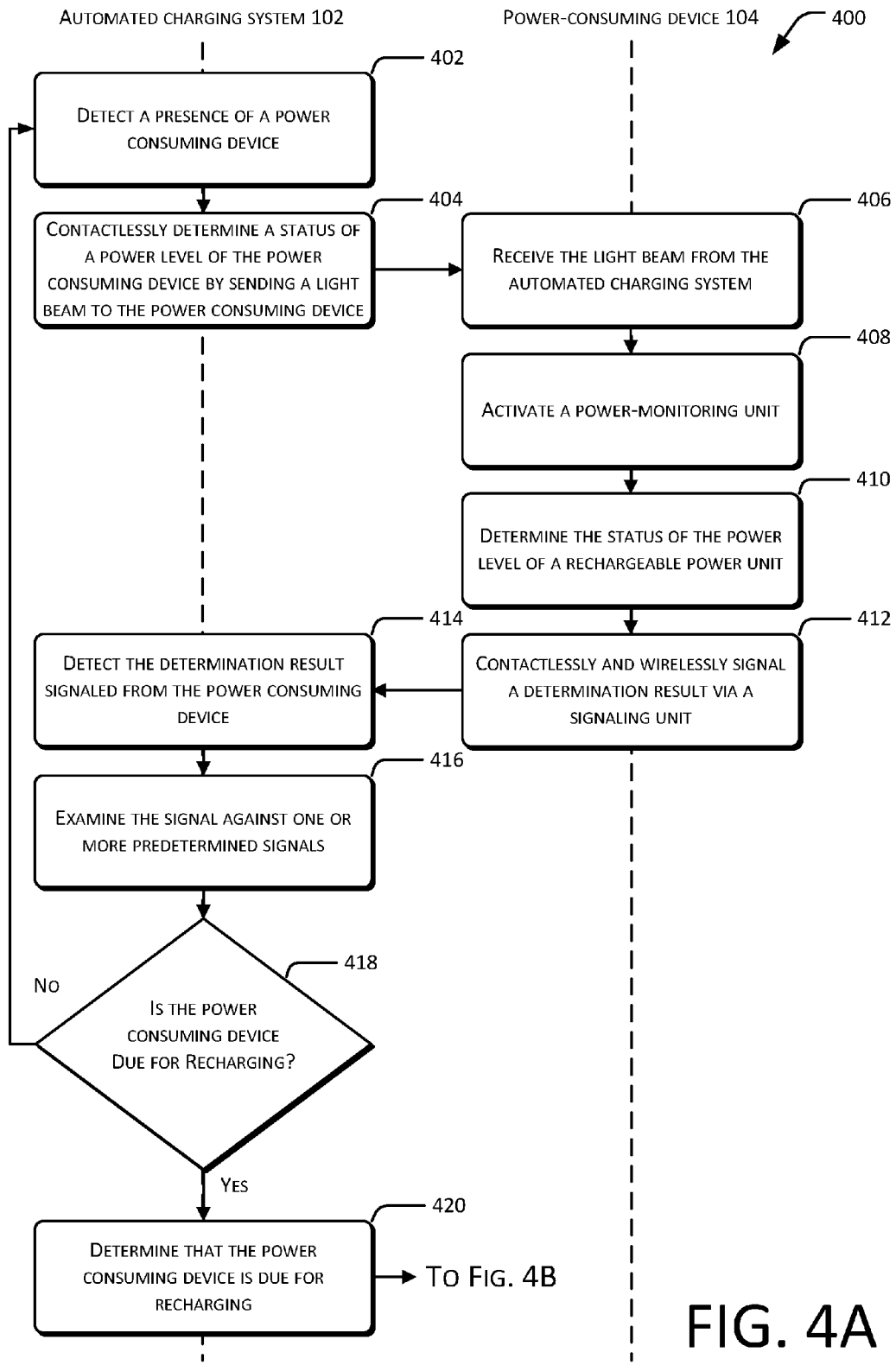
FIGS. 4A and 4B illustrate an example method of automatically charging a power-consuming device.
Figure 4B:
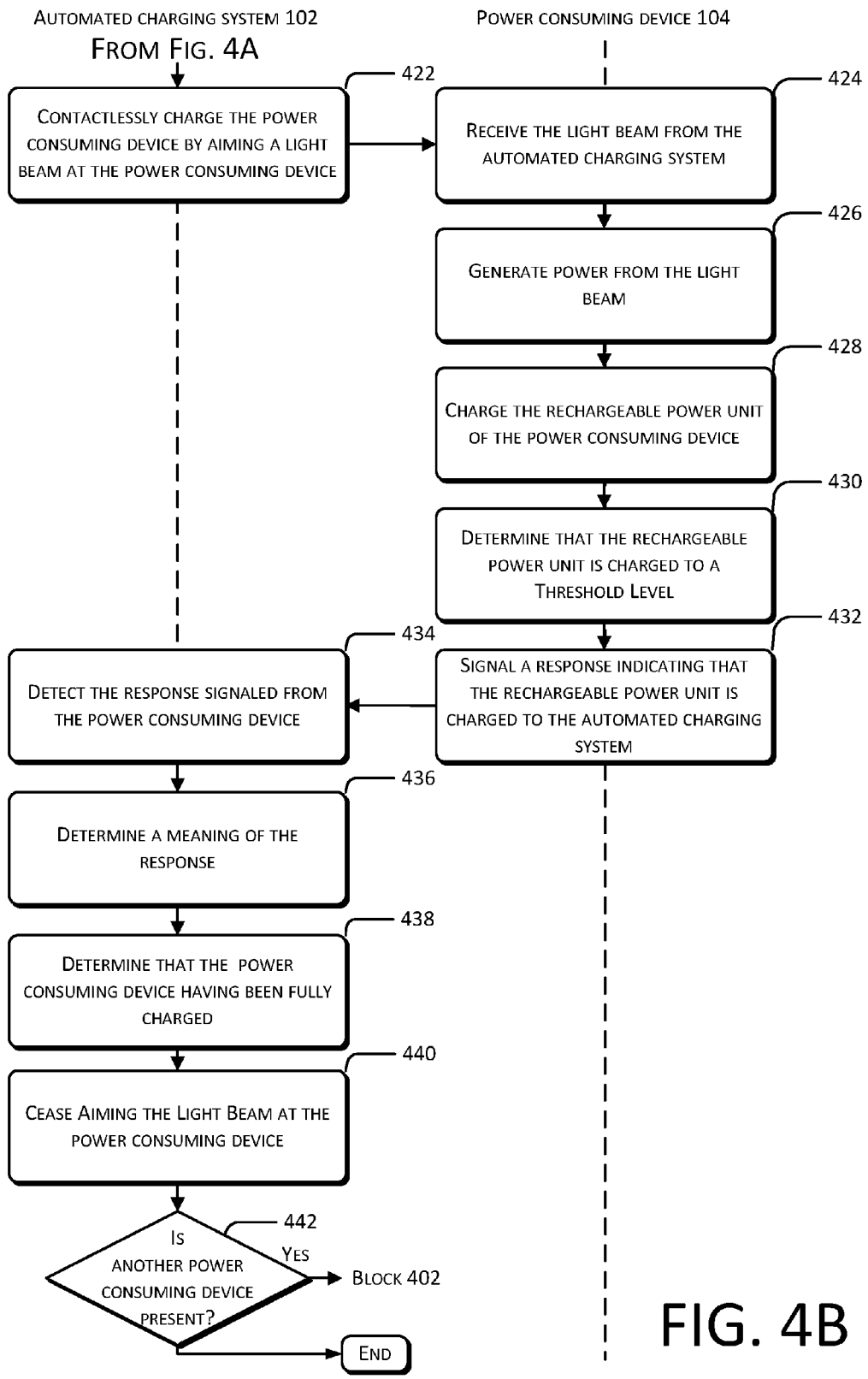

FIGS. 4A and 4B illustrate a flow chart depicting an example method 400 of automatically charging a power-consuming device. The method of FIGS. 4A and 4B may, but need not, be implemented in the environment of FIG. 1 and using the devices of FIGS. 2 and 3. For ease of explanation, method 400 is described with reference to FIGS. 1-3. However, the method 400 may alternatively be implemented in other environments and/or using other systems.

Method 400 is described in the general context of computer-executable instructions. Generally, computer-executable instructions can include routines, programs, objects, components, data structures, procedures, modules, functions, and the like that perform particular functions or implement particular abstract data types. The method can also be practiced in a distributed computing environment where functions are performed by remote processing devices that are linked through a communication network. In a distributed computing environment, computer-executable instructions may be located in local and/or remote computer storage media, including memory storage devices.

The exemplary method is illustrated as a collection of blocks in a logical flow graph representing a sequence of operations that can be implemented in hardware, software, firmware, or a combination thereof. The order in which the method is described is not intended to be construed as a limitation, and any number of the described method blocks can be combined in any order to implement the method, or alternate methods. Additionally, individual blocks may be omitted from the method without departing from the spirit and scope of the subject matter described herein. In the context of software, the blocks represent computer instructions that, when executed by one or more processors, perform the recited operations. In the context of hardware, some or all of the blocks may represent application specific integrated circuits (ASICs) or other physical components that perform the recited operations.

Referring back to FIGS. 4A and 4B, at block 402, the automated charging system 102 may detect a presence of a power-consuming device 104 within a neighborhood of the automated charging system 102. For example, the automated charging system 102 may detect the presence of the power-consuming device 104 by capturing one or more images associated with the neighborhood of the automated charging system 102 using the detector 308 (e.g., the image sensor) and recognizing the power-consuming device 104 from the one or more images. Additionally or alternatively, the automated charging system 102 may detect the presence of the power-consuming device 104 by receiving a presence signal from the power-consuming device 104. The power-consuming device 104 is a device that includes a rechargeable power unit 106 and is not in physical contact with the automated charging system 102. In one embodiment, the automated charging system 102 may receive information of one or more power-consuming devices 104 to be charged from a user 118 or predefined when or after manufacture of the automated charging system 102. In this case, the automated charging system 102 may determine that the power-consuming device 104 that is within the neighborhood of the automated charging system 102 is one of the power-consuming devices 104 compatible with the automated charging system 102 based on the information.

At block 404, in response to detecting the presence of the power-consuming device 104, the automated charging system 102 may contactlessly determine a status of a power level of the power-consuming device 104. For example, the automated charging system 102 may send a light beam to the power-consuming device 104 to activate a power monitoring unit 200 associated with the power-consuming device 104.

At block 406, a power generation unit 202 of the power-consuming device 104 receives the light beam from the automated charging system 102.

At block 408, in response to receiving the light beam from the automated charging system 102, the power generation unit 202 of the power-consuming device 104 activates a power monitoring unit 200. For example, the power generation unit 202 may energize the power monitoring unit 200 through a photovoltaic panel that generates power from the light beam received from the automated charging system 102. In one embodiment, the power monitoring unit 200 is in a shutdown or inoperable mode prior to receiving the power from the power generation unit 202. Furthermore, in some embodiments, the power monitoring unit 200 draws no power from the power-consuming device 104 for operation.

At block 410, after receiving the light beam from the automated charging system 102 (or receiving the power from the power generation unit 202), the power monitoring unit 200 of the power-consuming device 104 determines the status of the power level of the power-consuming device 104 (or the rechargeable power unit 106).

At block 412, the power monitoring unit 200 of the power-consuming device 104 contactlessly and wirelessly signals or sends a determination result or a signal to the automated charging system 102 via a signaling unit 206. The signal enables the automated charging system 102 to determine the status of the power level of the power-consuming device 104 (or the rechargeable power unit 106). The signal includes a light code made up of a light pattern emitted from one or more light-emitting diodes (e.g., the LEDs of the signaling unit 206) associated with the power monitoring unit 200.

At block 414, the automated charging system 102 receives or detects the determination result from the signaling unit 206.

At block 416, the automated charging system 102 examines the signal against one or more predetermined signals. In one embodiment, the one or more predetermined signals may include, but are not limited to, a signal indicating that the power level of the power-consuming device 104 is less than a predetermined threshold.

At block 418, the automated charging system 102 determines whether to charge the power-consuming device 104 based on the power level of the power-consuming device 104. For example, if the signal received by the automated charging system 102 indicates that the power level of the power-consuming device 104 is less than a predetermined threshold, the automated charging system 102 may determine to charge the power-consuming device 104. Alternatively, if the signal received by the automated charging system 102 indicates that the power level of the power-consuming device 104 is greater than or equal to the predetermined threshold, the automated charging system 102 may determine that the power-consuming device 104 is not due for recharging and searches for another power-consuming device or remains idle for a predetermined period of time.

At block 420, the automated charging system 102 determines that the power-consuming device 104 is due for recharging, e.g., determining that the power level of the power-consuming device is less than the predetermined threshold.

At block 422, the automated charging system 102 contactlessly charges the power-consuming device 104 (or the rechargeable power unit 106). For example, the automated charging system 102 may direct the light beam generator to send or aim a light beam at the power generation unit 202 of the power-consuming device 104 to generate power for charging the rechargeable power unit 106.

At block 424, the power generation unit 202 of the power-consuming device 104 receives the light beam from the automated charging device 102.

At block 426, the power generation unit 202 of the power-consuming device 104 generates power or converts light energy into electrical energy based on the light beam received from the automated charging device 102.

At block 428, the power generation unit 202 of the power-consuming device 104 charges up the rechargeable power unit 106 associated with the power-consuming device 104 using the generated power.

At block 430, the power monitoring unit 200 of the power-consuming device 104 determines that the power-consuming device 104 (or the rechargeable power unit 106) is fully charged.

At block 432, the power monitoring unit 200 of the power-consuming device 104 signals a response to the charging device via the signaling unit 206. The response indicates that the power-consuming device 104 is fully charged and requests the automated charging system 102 to cease sending the light beam. In one embodiment, the response includes a light code made up of a light pattern emitted from one or more light emitting diodes (e.g., the LEDs of the signaling unit 206) with the power-consuming device 104.

At block 434, the automated charging system 102 receives or detects the response from the signaling unit 206 of the power-consuming device 104.

At block 436, the automated charging system 102 determines a meaning of the response. For example, the automated charging system 102 may check the response against one or more predefined responses stored in the memory 302.

At block 438, the automated charging system 102 determines that the response indicating the power-consuming device being fully charged.

At block 440, the automated charging system 102 ceases contactlessly charging the power-consuming device 104. For example, the automated charging system 102 may instructs the light beam generator to shut off, not sending the light beam onto the power-consuming device 104 (or the power generation unit 202 of the power-consuming device 104).

At block 442, the automated charging system 102 determines whether another power-consuming device 104 is present in a neighborhood of the automated charging system 102 and repeats the above operations if the other power-consuming device 104 is in need of recharging. Alternatively, the automated charging system 102 may change to an idle or hibernation mode for a predetermined period of time or until a new motion is detected.

Any of the acts of any of the methods described herein may be implemented at least partially by a processor or other electronic device based on instructions stored on one or more computer-readable media. By way of example and not limitation, any of the acts of any of the methods described herein may be implemented under control of one or more processors configured with executable instructions that may be stored on one or more computer-readable media such as one or more computer storage media.

CONCLUSION

Although embodiments have been described in language specific to structural features and/or methodological acts, it is to be understood that the claims are not necessarily limited to the specific features or acts described. Rather, the specific features and acts are disclosed as exemplary forms of implementing the claimed subject matter.

What is claimed is:

1. A method executable by a power-consuming device, the method comprising:
   receiving a light beam from a charging device via a photovoltaic cell of the power-consuming device;
   in response to receiving the light beam, activating a power monitoring unit of the power-consuming device, wherein the power monitoring unit determines a power level of a rechargeable power unit of the power-consuming device, wherein the power monitoring unit is activated in part by receiving power from the charging device;
   contactlessly and wirelessly signaling, by the power monitoring unit, the power level to the charging device, the signaling enabling the charging device to determine a status of the power level of the power-consuming device that indicates an ability of the power-consuming device to accept power from the charging device;
   after signaling the power level to the charging device, receiving another light beam from the charging device;
   generating power using energy received from the other light beam using the photovoltaic cell; and
   charging a battery of the power-consuming device using the generated power.

2. The method as recited in claim 1, further comprising, prior to determining the power level, activating the power monitoring unit associated with the power-consuming device, the power monitoring unit drawing no power from a rechargeable power unit for operation.

3. The method as recited in claim 2, wherein activating the power monitoring unit comprising energizing the power monitoring unit through a photovoltaic panel that generates power from the light beam received from the charging device.

4. The method as recited in claim 2, wherein the power monitoring unit is in a low-power mode prior to the activating.

5. The method as recited in claim 1, further comprising:
   determining that the power-consuming device is fully charged; and
   signaling to the charging device to cease sending the other light beam.

6. The method as recited in claim 5, wherein the signaling comprises sending a light code made up of a light pattern emitted from the power-consuming device.

7. A power-consuming device comprising:
   a power generation unit communicatively coupled to a power monitoring unit, the power generation unit configured to receive a light beam from a charging device via a photovoltaic cell;
   the power monitoring unit communicatively coupled to the power generation unit, the power monitoring unit configured to:
      based at least in part on the light beam, determine a power level of a battery associated with the power-consuming device, wherein the power monitoring unit is activated in response to receipt of the light beam, and wherein the power monitoring unit is activated in part by receiving power from the charging device;
      contactlessly and wirelessly signal the power level to the charging device, wherein the power level indicates an ability of the power-consuming device to accept power from the charging device; and
      determine that the power level of the battery is less than a predetermined threshold; and
   the power generation unit configured to:
      generate power from another light beam received from the charging device using the photovoltaic cell, by converting the other light beam into electrical energy, the other light beam received in response to the power level signaled to the charging device;
      provide the generated power to the power monitoring unit; and
      charge the battery based at least in part on the determination that the power level of the battery is less than the predetermined threshold.

8. The power-consuming device of claim 7, wherein the photovoltaic cell comprises a photovoltaic panel.

9. The power-consuming device of claim 7, wherein the power monitoring unit comprises at least one of a microcontroller or a processor.

10. The power-consuming device of claim 7, further comprising:
    the battery.

11. The power-consuming device of claim 7, wherein the power monitoring unit is configured to determine the power level of the battery without drawing power from the battery.

12. The power-consuming device of claim 7, wherein the power monitoring unit is configured to determine the power level of the battery by using power received from the power generation unit.

* * * * *